(12) United States Patent
Koga

(10) Patent No.: US 9,077,216 B2
(45) Date of Patent: Jul. 7, 2015

(54) STATOR FOR ROTATING ELECTRICAL MACHINE

(75) Inventor: Kiyotaka Koga, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 259 days.

(21) Appl. No.: 13/445,531

(22) Filed: Apr. 12, 2012

(65) Prior Publication Data

US 2012/0274172 A1 Nov. 1, 2012

Related U.S. Application Data

(60) Provisional application No. 61/555,195, filed on Nov. 3, 2011.

(30) Foreign Application Priority Data

Apr. 28, 2011 (JP) .................................. 2011-101477

(51) Int. Cl.
*H02K 3/12* (2006.01)
*H02K 15/06* (2006.01)

(52) U.S. Cl.
CPC ................ *H02K 3/12* (2013.01); *H02K 15/066* (2013.01)

(58) Field of Classification Search
CPC ................................ H02K 15/066; H02K 3/12
USPC .................................................. 310/208, 179
See application file for complete search history.

(56) References Cited

U.S. PATENT DOCUMENTS

| | | | | |
|---|---|---|---|---|
| 5,955,810 A * | 9/1999 | Umeda et al. | ................. | 310/208 |
| 6,741,004 B2 * | 5/2004 | Senoo et al. | ................... | 310/215 |
| 6,960,857 B2 * | 11/2005 | Oohashi et al. | ............... | 310/179 |
| 7,042,129 B2 * | 5/2006 | Neet | .............................. | 310/208 |
| 7,141,908 B2 * | 11/2006 | Holmstrom et al. | ........ | 310/254.1 |
| 2005/0042097 A1 | 2/2005 | Wobben | | |
| 2005/0062359 A1 * | 3/2005 | Neet et al. | ..................... | 310/214 |
| 2006/0232070 A1 | 10/2006 | Wobben | | |
| 2006/0232156 A1 | 10/2006 | Wobben | | |
| 2007/0278889 A1 | 12/2007 | Sasaki et al. | | |
| 2008/0174199 A1 * | 7/2008 | Ishigami et al. | .............. | 310/199 |
| 2008/0315707 A1 | 12/2008 | Wobben | | |
| 2010/0117481 A1 * | 5/2010 | Greaves et al. | ............... | 310/208 |
| 2011/0005808 A1 * | 1/2011 | White et al. | ............... | 174/126.2 |

FOREIGN PATENT DOCUMENTS

| | | |
|---|---|---|
| JP | A-07-163074 | 6/1995 |
| JP | A-08-205441 | 8/1996 |

(Continued)

OTHER PUBLICATIONS

Jul. 3, 2012 International Search Report issued in International Application No. PCT/JP2012/059230 (with translation).

*Primary Examiner* — Alex W Mok
(74) *Attorney, Agent, or Firm* — Oliff PLC

(57) ABSTRACT

A stator for a rotating electrical machine includes a stator core with a plurality of slots; and coils attached to the stator core. The coils are each structured by winding a covered conductor wire bundle around the stator core. The covered conductor wire bundle is structured by covering an outer circumference of a conductor wire bundle with a flexible insulating cover, the conductor wire bundle consisting of an assembly of a plurality of conductor wires. A plurality of the covered conductor wire bundles is disposed in each slot such that adjacent pairs of the covered conductor wire bundles are in contact with each other.

12 Claims, 6 Drawing Sheets

(56) References Cited

FOREIGN PATENT DOCUMENTS

| JP | A-09-009588 | 1/1997 |
|---|---|---|
| JP | A-09-121488 | 5/1997 |
| JP | A-2004-159460 | 6/2004 |
| JP | A-2004-537247 | 12/2004 |
| JP | A-2006-340409 | 12/2006 |
| JP | A-2007-227262 | 9/2007 |
| JP | A-2007-227263 | 9/2007 |
| JP | A-2007-325378 | 12/2007 |
| JP | A-2008-186724 | 8/2008 |
| JP | A-2008-193860 | 8/2008 |
| JP | 2009-199749 | 9/2009 |
| JP | A-2010-055806 | 3/2010 |
| JP | A-2011-091943 | 5/2011 |

* cited by examiner

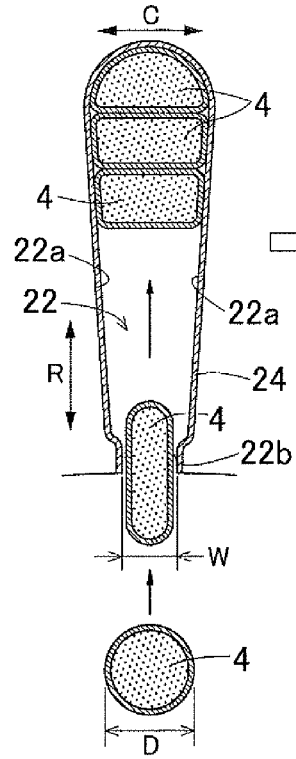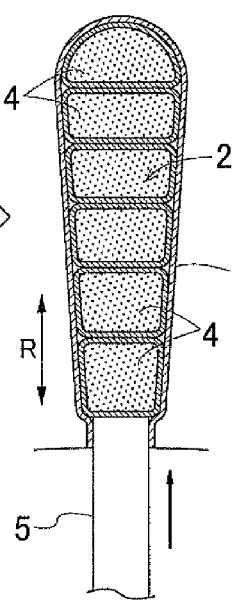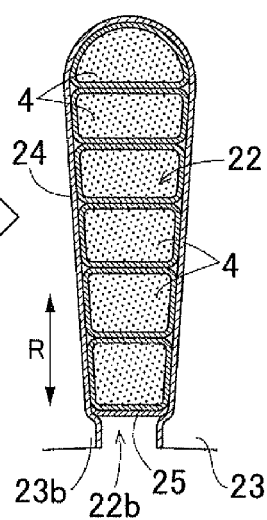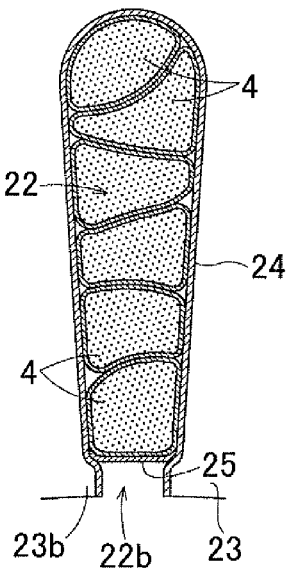

STATOR FOR ROTATING ELECTRICAL MACHINE

This nonprovisional application claims the benefit of U.S Provisional Application No. 61/555,195, filed Nov. 3, 2011.

INCORPORATION BY REFERENCE

The disclosure of Japanese Patent Application No. 2011-101477 filed on Apr. 28, 2011 including the specification, drawings and abstract is incorporated herein by reference in its entirety.

BACKGROUND OF THE INVENTION

The present invention relates to a stator for a rotating electrical machine including a stator core with a plurality of slots and coils attached to the stator core.

DESCRIPTION OF THE RELATED ART

Up to now, a rotating electrical machine serving as an electric motor or a power generator has used a stator for a rotating electrical machine including a stator core with a plurality of slots and coils attached to the stator core. For example, Japanese Patent Application Publication No. 09-009588 (JP 09-009588 A) describes a stator for a rotating electrical machine including a stator core with a plurality of slots distributed in the circumferential direction of the stator core and coils structured by winding conductor wires with circular cross-sections around the slots a large number of turns.

In such a stator for a rotating electrical machine including coils structured using conductor wires with circular cross-sections, gaps are easily left between the conductor wires in slots, and therefore it is difficult to increase a space factor of the coils. Although a reduction of the diameter of the conductor wires may be effective in reducing the size of the gaps between the conductor wires to increase the space factor, a reduction of the diameter of the conductor wires may require, for example, devices to prevent breaks in the conductor wires during winding of the conductor wires around the stator core, and a long time in a winding process due to the increased number of turns around the stator core. Meanwhile, structuring coils using conductor wires with rectangular cross-sections may also be effective in increasing the space factor of the coils. However, the shapes of the slots are substantially limited to rectangles, and the shapes of the slots or teeth may not be optimized.

SUMMARY OF THE INVENTION

To solve this problem, a stator for a rotating electrical machine, capable of simplifying a process of winding wire around a stator core and capable of increasing the space factor of coils regardless of the shape of slots, is desired.

A stator for a rotating electrical machine according to an aspect of the present invention includes a stator core with a plurality of slots and coils attached to the stator core. The coils are each structured by winding a covered conductor wire bundle around the stator core. The covered conductor wire bundle is structured by covering an outer circumference of a conductor wire bundle with a flexible insulating cover, the conductor wire bundle consisting of an assembly of a plurality of conductor wires. A plurality of covered conductor wire bundles is disposed in each slot such that adjacent pairs of the covered conductor wire bundles are in contact with each other.

Herein, the outer circumference of the conductor wire bundle refers to the periphery (outer circumference) of a cross-section of the conductor wire bundle, and the cross-section is orthogonal to a direction along which the conductor wire bundle extends. In the present invention, the number of covered conductor wire bundles disposed in each slot is counted by focusing only on portions located inside the slot. Consequently, the concept of the covered conductor wire bundles disposed in each slot in the present invention includes the covered conductor wire bundles interconnected outside the slot to form one covered conductor wire bundle when detached from the stator core. In the present invention, the term "rotating electrical machine" is used as a concept including a motor (electric motor), a generator (power generator), and a motor/generator that functions as both a motor and a generator as required.

According to the aspect, the shapes of the cross-sections of the covered conductor wire bundles can be deformed relatively freely, the cross-sections being orthogonal to the extending direction of the covered conductor wire bundles. This would facilitate insertion of the covered conductor wire bundles into the slots if openings of the slots are narrow. In addition, each of the covered conductor wire bundles is structured by tying the plurality of conductor wires. This enables thin conductor wires to be used to increase the space factor and the number of turns of wire around the stator core to be kept small to increase efficiency of the winding process of the covered conductor wire bundles. Furthermore, the conductor wire bundles are covered with the insulating covers. This can reduce the risk of damage to the conductor wires when the conductor wires are fitted into the slots, and can easily increase the insulation properties. In addition, gaps between the covered conductor wire bundles can be kept small by placing the covered conductor wire bundles such that adjacent pairs of the covered conductor wire bundles are in contact with each other after the covered conductor wire bundles are fitted in the slots, and gaps between the covered conductor wire bundles and the inner wall surfaces of the slots can be kept small by deforming the covered conductor wire bundles in accordance with the shapes of the slots. This enables the space factor to be further increased. Accordingly, this characteristic structure provides a stator for a rotating electrical machine capable of simplifying a process of winding wire around a stator core and capable of increasing the space factor of coils regardless of the shape of slots.

Herein, the cross-sections of the covered conductor wire bundles disposed in the same slots may have different shapes, the cross-sections being orthogonal to the extending direction of the covered conductor wire bundles.

Since the shapes of the cross-sections of the covered conductor wire bundles disposed in each slot are deformed so as to differ from each other as described above, the gaps between the covered conductor wire bundles and those between the covered conductor wire bundles and the inner wall surface of the slot can be easily kept small in accordance with the shape of the slot. This can lead to an increase in the space factor of the coils regardless of the shapes of the slots.

In addition, at least one of the covered conductor wire bundles disposed in each slot may have a portion whose shape follows the inner wall surface of the slot, and be in surface contact with the inner wall surface at the portion.

Since at least one of the covered conductor wire bundles disposed in each slot is deformed in accordance with the shape of the slot and is in surface contact with the inner wall surface of the slot such that the size of the gaps between the covered conductor wire bundle and the inner wall surface is reduced, the space factor of the coils can be increased regardless of the shapes of the slots.

In addition, the conductor wires each may have a circular cross-section orthogonal to a direction along which the conductor wires extend.

According to this structure, the covered conductor wire bundles each have gaps formed in a space enclosed by the insulating cover. This enables the conductor wires in the space enclosed by the insulating cover to move easily, and thereby enables the cross-sectional shapes of the covered conductor wire bundles to be deformed more easily. As a result, the covered conductor wire bundles can be easily fitted into the slots. In addition, the covered conductor wire bundles can be deformed such that the gaps between the covered conductor wire bundles and those between the covered conductor wire bundles and the inner wall surfaces of the slots are kept small after the covered conductor wire bundles are fitted in the slots. This enables the space factor of the coils to be easily increased.

In addition, the diameter of the cross-sections of the covered conductor wire bundles may be larger than the open width of openings of the slots in a plane orthogonal to the direction along which the covered conductor wire bundles extend when the cross-sections orthogonal to the extending direction are circular.

This structure enables the number of turns of wire around the stator core to be kept small, thereby easily leading to greater efficiency of the winding process. The shapes of the cross-sections of the covered conductor wire bundles can be deformed relatively freely also in this case, and the covered conductor wire bundles can be easily fitted into the slots.

In addition, the covered conductor wire bundles may be disposed in each slot while maintaining the shapes formed when the covered conductor wire bundles are pushed from an opening side of the slot that is open in a direction orthogonal to the extending direction of the covered conductor wire bundles.

This structure enables a state where the covered conductor wire bundles push each other in the slots. As a result, the covered conductor wire bundles can be disposed in the slots while deformed in accordance with the shapes of the slots such that the size of the gaps between the covered conductor wire bundles and those between the covered conductor wire bundles and the inner wall surfaces of the slots is reduced. This can lead to an increase in the space factor of the coils regardless of the shapes of the slots.

In addition, the conductor wires may be bare wires. Herein, bare wires refer to open conductor wires that do not have surfaces covered with insulator. Accordingly, conductor wires having surfaces on which covers or films, composed of electrically insulating material such as resin, are formed are not included in the bare wires. However, conductor wires having surfaces on which oxide films are formed are included in the bare wires.

With this structure, the cross-sectional area of the conductor in the cross-sections of the covered conductor wire bundles can be easily increased compared with the case where insulating covers or films are formed on the surfaces of the conductor wires. As a result, the density of the conductor in the slots can be increased, and thereby the space factor of the coils can be easily increased.

In addition, the slots may extend in an axial direction of a cylindrical core reference plane of the stator core and be distributed in a circumferential direction of the core reference plane, the stator core may have a plurality of teeth formed between two adjacent slots, and each tooth may have two side surfaces that face in the circumferential direction and that are parallel to each other.

With this structure, the cross-sectional area of a magnetic path in each tooth can be uniform in all the teeth. As a result, unnecessary teeth width can be reduced to maximize the space inside the slots while a required amount of magnetic flux is ensured in each tooth, and the proportion of the cross-sectional area of the coils to that of the stator can be easily increased.

BRIEF DESCRIPTION OF THE DRAWINGS

FIGS. 5A to 5C illustrate processes of manufacturing the stator for the rotating electrical machine according to the embodiment of the present invention;

FIG. 6 is a partially enlarged cross-sectional view illustrating another embodiment of the stator for the rotating electrical machine according to the present invention;

DETAILED DESCRIPTION OF THE EMBODIMENTS

Figure 1:
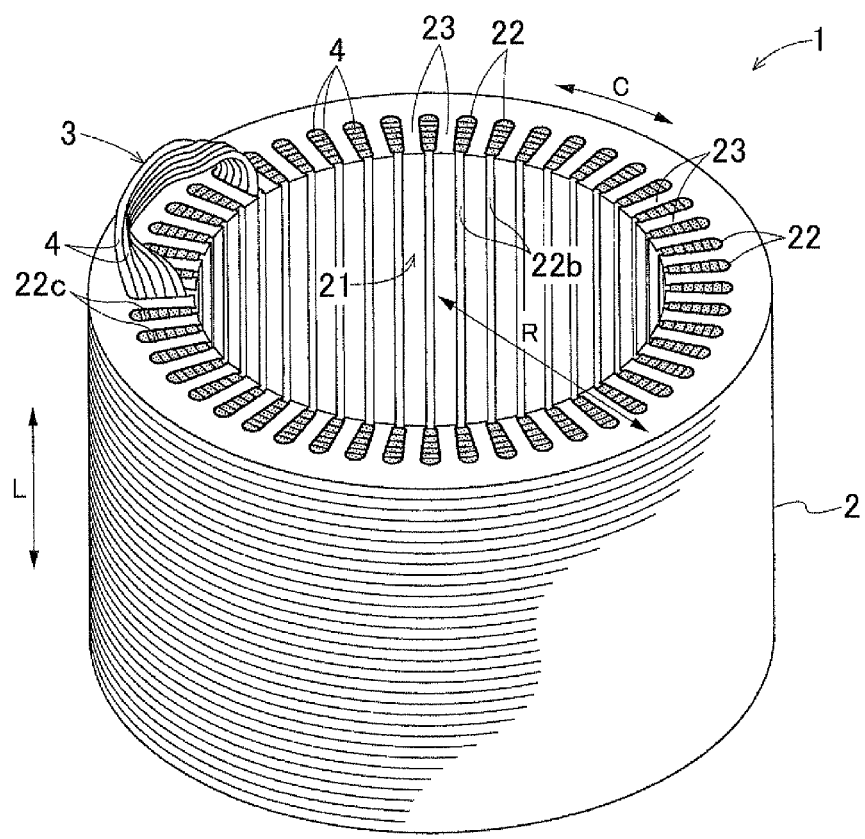
FIG. 1 is a perspective view of a stator for a rotating electrical machine according to an embodiment of the present invention.
Figure 3:
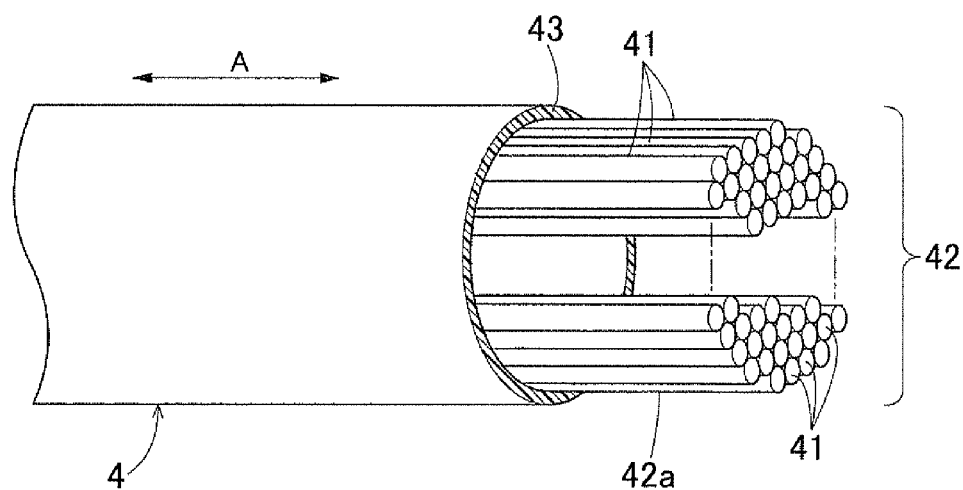
FIG. 3 is a perspective view illustrating the structure of a covered conductor wire bundle of the stator for the rotating electrical machine according to the embodiment of the present invention.

A stator for a rotating electrical machine according to an embodiment of the present invention will now be described with reference to the drawings. Herein, an example of the stator for the rotating electrical machine according to the present invention applied to a stator 1 of a rotating electrical machine of the inner rotor type will be described. The stator 1 according to this embodiment includes a stator core 2 and coils 3 attached to the stator core 2 as illustrated in FIG. 1. The coils 3 are structured by winding covered conductor wire bundles 4 around the stator core 2. As illustrated in FIG. 3, the covered conductor wire bundles 4 each have a structure in which an outer circumference 42a of a conductor wire bundle 42 consisting of an assembly of a plurality of conductor wires 41 is covered with a flexible insulating cover 43. The stator 1 according to this embodiment is characterized in that the stator 1 uses such covered conductor wire bundles 4. The structure of the stator 1 according to this embodiment will now be described in detail. In the description below, the terms "axial direction L", "circumferential direction C", and "radial directions R" are defined with respect to the center axis of a cylindrical core reference plane 21 of the stator core 2 (for example, the inner circumferential surface of the stator core 2) described below unless otherwise specified.

1. Entire Structure of Stator

Figure 2:
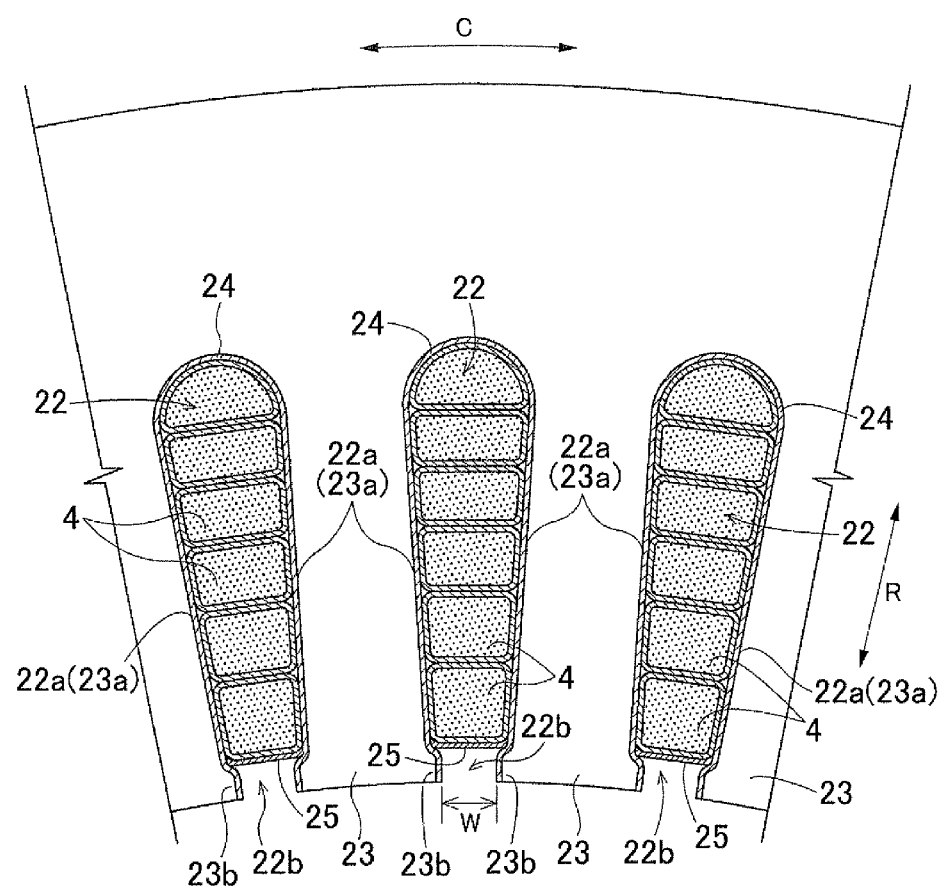
FIG. 2 is a partially enlarged cross-sectional view of the stator for the rotating electrical machine according to the embodiment of the present invention.

The entire structure of the stator 1 according to this embodiment will now be described with reference to FIGS. 1 and 2. As illustrated in FIG. 1, the stator 1 includes the stator core 2 and the coils 3. Herein, coil end portions refer to portions of the coils 3 protruding from the stator core 2 in the axial direction L, and FIG. 1 illustrates only a coil end portion protruding from a pair of slots 22 for purposes of brevity. Accordingly, FIG. 1 illustrates cross-sections of the covered conductor wire bundles 4 that structure the coils 3 at end portions of the other slots 22 in the axial direction L.

The stator core 2 is composed of a magnetic material, and has the plurality of slots 22 such that the coils 3 can be wound. Herein, the slots 22 extend in the axial direction L of the cylindrical core reference plane 21 of the stator core 2, and are distributed in the circumferential direction C of the core reference plane 21. In addition, the slots 22 are formed so as to radially extend from the center axis of the stator core 2 in the radial directions R. Herein, the term "cylindrical core reference plane 21" refers to a virtual plane serving as a reference in terms of the layout and the structure of the slots 22. In this embodiment, the inner circumferential surface of the core serving as a virtual cylindrical plane including end surfaces of a plurality of teeth 23 located inward in the radial directions R, each tooth 23 being formed between two adjacent slots 22, is defined as the core reference plane 21 as illustrated in FIG. 1. Herein, a cylindrical plane (including a virtual plane) coaxial with the cylindrical inner circumferential surface of the core and having a cross-sectional shape similar to that of the inner circumferential surface of the core when viewed in the axial direction L may also be the "cylindrical core reference plane 21" according to the present invention. In this embodiment, for example, the outer circumferential surface of the stator core 2 may also be defined as the "cylindrical core reference plane 21" since the stator core 2 has a cylindrical shape as illustrated in FIG. 1.

The stator core 2 has the plurality of slots 22 distributed in the circumferential direction C at regular intervals. The slots 22 have the same shape. The stator core 2 further has the plurality of teeth 23 each formed between two adjacent slots 22. In this embodiment, the slots 22 have a groove-like shape having a predetermined width in the circumferential direction C and extending in the axial direction L and in the radial directions R. In this embodiment, two side surfaces 23a of each tooth 23 facing in the circumferential direction C are parallel to each other, that is, the teeth 23 are parallel teeth as illustrated in FIG. 2. As a result, the width of each slot 22 in the circumferential direction C increases outward in the radial direction R. That is, an inner wall surface 22a of each slot 22 includes two planes facing each other in the circumferential direction C and formed such that the gap between the two planes increases outward in the radial direction R, and a plane with an arc-shaped cross-section formed outward of the two planes in the radial direction R and extending in the axial direction L. In addition, each slot 22 is formed to have an radial opening 22b that is open inward in the radial direction R (open in the inner circumferential surface of the stator core 2) and axial openings 22c that are open in both sides of the stator core 2 in the axial direction L (both end surfaces in the axial direction). A slot insulating portion 24 is formed on the inner wall surface 22a of each slot 22. In this embodiment, the entire inner wall surfaces 22a are coated with insulating powder, and the slot insulating portions 24 are formed of the coating films of the insulating powder coating.

Each tooth 23 is formed between two slots 22 adjacent to each other in the circumferential direction C of the stator core 2. In this embodiment, each tooth 23 is formed such that two parallel side surfaces 23a (hereinafter simply referred to as "tooth side surfaces 23a") faces each other in the circumferential direction C of the tooth 23. That is, the stator core 2 according to this embodiment includes parallel teeth. Herein, circumferential protruding portions 23b are formed at an end portion of each tooth 23 so as to protrude in the circumferential direction C with respect to other portions of the tooth side surfaces 23a. As a result, most of the two tooth side surfaces 23a are parallel to each other except for the stepped portions for forming the circumferential protruding portions 23b. As is clear from FIG. 2, these two tooth side surfaces 23a are disposed to be parallel to each other in the radial directions R.

Since each tooth 23 has the circumferential protruding portions 23b at the end portion thereof as described above, the open width W of the radial opening 22b of each slot 22 is reduced compared with the width of other portions located outward in the radial direction R. Herein, the open width W of the radial opening 22b refers to the width of the radial opening 22b in the circumferential direction C, that is, the width in a direction orthogonal to the radial direction R. As illustrated in the cross-section in FIG. 2, the open width W is the width of the radial opening 22b in a plane orthogonal to the axial direction L of the stator 1. In addition, the open width W of the radial opening 22b of each slot 22 is reduced compared with the width of the portion, at which the coil 3 is disposed, in the circumferential direction C. In general, these slots 22 are referred to as semi-open slots. In this embodiment, the radial openings 22b function as openings of the slots 22 which open in a direction orthogonal to an extending direction A of the covered conductor wire bundles 4, since the extending direction A of the covered conductor wire bundles 4 is parallel to the axial direction L as described below. In addition, the open width W of the radial openings 22b in the circumferential direction C corresponds to the open width of the openings of the slots 22 in a plane orthogonal to the extending direction A of the covered conductor wire bundles 4.

The rotating electrical machine in this embodiment is a three-phase AC motor or a three-phase AC generator driven by three-phase alternating currents (U-phase, V-phase, and W-phase). Accordingly, the coils 3 of the stator 1 are respectively classified as U-phase coils, V-phase coils, and W-phase coils according to the three phases (U-phase, V-phase, and W-phase, respectively), and the slots 22 for U-phase, V-phase, and W-phase are laid out so as to repeatedly appear in the circumferential direction C in the stator core 2. In this example, two U-phase slots into which the U-phase coils are fitted, two V-phase slots into which the V-phase coils are fitted, and two W-phase slots into which the W-phase coils are fitted are laid out in the stator core 2 so as to repeatedly appear in the circumferential direction C in this order such that the number of slots per pole per phase becomes "2". The coils 3 are structured by winding the covered conductor wire bundles 4 around the stator core 2. The covered conductor wire bundles 4 may be wound around the stator core 2 using various well-known methods. For example, the coils 3 may be structured by winding the covered conductor wire bundles 4 around the stator core 2 using a combination of one of lap winding and wave winding and one of concentrated winding and distribution winding.

In this manner, the stator 1 is structured as an armature of the rotating electrical machine. Although not illustrated, a rotor serving as a field magnet including permanent magnets or electromagnets is disposed inward in the radial directions R of the stator 1 (stator core 2) so as to be relatively rotatable with respect to the stator 1. The rotor rotates in response to a revolving field generated by the stator 1. That is, the stator 1 according to this embodiment has a structure used for a rotating electrical machine of the inner rotor type and of the revolving-field type.

The above-described stator core 2 may be, for example, a layered structure including a laminate of a plurality of annular disc-shaped magnetic steel sheets, or may be mainly formed of a compact formed by pressure-forming magnetic powder. Although the slots 22 are formed in the stator core 2 such that the number of slots per pole per phase is "2" in this embodiment, the number of slots per pole per phase may be changed as appropriate as a matter of course. For example, the number of slots per pole per phase may be set to "1", "3", or the like. The number of phases of the AC power source that drives the rotating electrical machine may also be changed to, for example, "1", "2", or "4" as appropriate.

2. Structure of Coated Conductor Wire Bundle

Next, the covered conductor wire bundles 4 that structure the coils 3 will be described. The covered conductor wire bundles 4 are conductors that structure the coils 3 of each phase, and the coils 3 of the stator 1 are structured by winding the covered conductor wire bundles 4 around the stator core 2. As illustrated in FIG. 3, the covered conductor wire bundles 4 each include the conductor wire bundle 42 consisting of an assembly of the conductor wires 41 and the flexible insulating cover 43 that covers the outer circumference 42a of the conductor wire bundle 42.

The conductor wires 41 are linear conductors composed of, for example, copper or aluminum. In this embodiment, each conductor wire 41 has a circular cross section orthogonal to a direction along which the conductor wire 41 extends, and the diameter thereof is relatively small. For example, the conductor wires 41 having a circular cross-section with a diameter of 0.2 mm or less are preferably used. In addition, the conductor wires 41 used in this embodiment are bare wires. That is, the surfaces of the conductor wires 41 formed of the bare wires composed of, for example, copper or aluminum are not covered with insulator, and the surfaces of the conductors are exposed. Although oxide films formed by oxidation of the surfaces of the conductors may have low electrical insulation properties in some cases, these oxide films are not included in the insulator described herein. Accordingly, the conductors having oxide films formed on the surfaces thereof are also included in the conductor wires 41 formed of the bare wires. Preferably, insulating films composed of an electrically insulating material such as resin (for example, polyamide-imide resin and polyimide resin) may also be formed on the surfaces of the conductor wires 41. These insulating films are formed as films that cover the respective surfaces of the conductor wires 41 unlike the insulating cover 43 described below.

The plurality of conductor wires 41 are assembled to structure a conductor wire bundle 42. The number of conductor wires 41 that structure the conductor wire bundle 42 is determined in accordance with the final thickness (cross-sectional area) of the covered conductor wire bundle 4 and the thickness (cross-sectional area) and the shape of each conductor wire 41. In this embodiment, the thickness (cross-sectional area) of each covered conductor wire bundle 4 is set such that six covered conductor wire bundles 4 fill the space inside each slot 22 as illustrated in FIG. 2, and the thickness (cross-sectional area) of the conductor wire bundles 42 and the thickness (cross-sectional area), the number, and the like of the conductor wires 41 are set accordingly. In this embodiment, a conductor wire bundle 42 is structured by twisting and bundling the conductor wires 41, as illustrated in FIG. 3.

The insulating cover 43 is an electrically insulating flexible member, and covers the outer circumference 42a of the conductor wire bundle 42. Herein, the outer circumference 42a of the conductor wire bundle 42 refers to the periphery (outer circumference) of a cross-section of the conductor wire bundle 42, and the cross-section is orthogonal to the extending direction A. The outer circumference 42a does not include ends of the conductor wire bundle 42 in the extending direction A. That is, the insulating cover 43 covers the entire outer circumference 42a of the conductor wire bundle 42, and at the same time, covers the entire area of the conductor wire bundle 42 in the extending direction A except for connecting portions formed at the ends in the extending direction A. Herein, the connecting portions are portions for electrically connecting a covered conductor wire bundle 4 to another covered conductor wire bundle 4 or another conductor. Since the extending direction A of the conductor wire bundle 42 is equal to the extending direction of the covered conductor wire bundle 4, the extending direction of the conductor wire bundle 42 is also indicated by the same symbol "A". A flexible material with electrical insulation properties is used as the insulating cover 43. For example, various synthetic resins such as fluorocarbon resin, epoxy resin, polyphenylenesulfide may be used. Herein, "flexible" refers to a property of being bendable or warpable.

Figure 4:
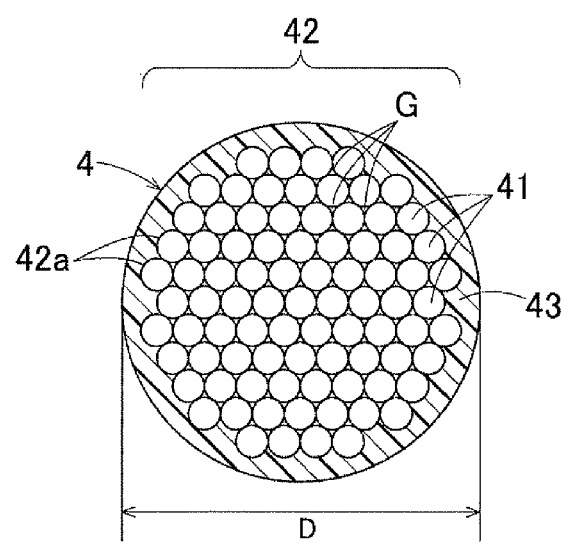
FIG. 4 is a cross-sectional view illustrating the structure of the covered conductor wire bundle of the stator for the rotating electrical machine according to the embodiment of the present invention.

The insulating cover 43 can be formed by, for example, moving the conductor wire bundle 42 along the extending direction A while an appropriate amount of melted resin material is being supplied to the outer circumference 42a of the conductor wire bundle 42. In a case where the insulating cover 43 is formed using the melted resin material in this manner, the inner circumferential surface of the insulating cover 43 becomes uneven so as to fit the shape of the outer circumference 42a of the conductor wire bundle 42 as illustrated in FIG. 4. In this case, no gaps are formed between the insulating cover 43 and the outer circumference 42a of the conductor wire bundle 42, more specifically, between the insulating cover 43 and the surfaces of the outermost conductor wires 41 in the conductor wire bundle 42 in the radial directions. In this embodiment, however, the conductor wires 41 used each have a circular cross section orthogonal to the extending direction A as described above. As a result, gaps G are formed between the plurality of conductor wires 41 that structure the conductor wire bundle 42. The insulating cover 43 can also be formed by, for example, wrapping the outer circumference 42a of the conductor wire bundle 42 in a sheet-like material or cylindrical material. In this case, the gaps G are formed between the plurality of conductor wires 41 that structure the conductor wire bundle 42 and between the inner circumferential surface of the insulating cover 43 and the outer circumference 42a of the conductor wire bundle 42 unlike the example illustrated in FIG. 4. In either case, the covered conductor wire bundle 4 according to this embodiment has the gaps G in the space enclosed by the insulating cover 43.

Since the covered conductor wire bundle 4 has a structure in which the outer circumference 42a of the conductor wire bundle 42 consisting of an assembly of the plurality of conductor wires 41 is covered by the flexible insulating cover 43 as described above, the plurality of conductor wires 41 can relatively move inside the insulating cover 43. Therefore, the covered conductor wire bundle 4 is structured such that the shape of the cross-section thereof orthogonal to the extending direction A can be deformed relatively freely (see FIGS. 5A to 5C). In accordance with the structure according to this embodiment, each conductor wire 41 has a circular cross-section with a relatively small diameter, and the gaps G are formed inside the space enclosed by the insulating cover 43 in the covered conductor wire bundle 4 as described above. This enables the cross-sectional shape of the covered conductor wire bundle 4 to be deformed more easily. As a result, the covered conductor wire bundle 4 can be easily warped and deformed along the extending direction A (longitudinal direction), and at the same time, the cross-sectional shape thereof orthogonal to the extending direction A can be easily deformed. In this embodiment, as illustrated in FIG. 5A, a diameter D (see also FIG. 4) of the cross-section of the covered conductor wire bundle 4 is set to be larger than the open width W of the radial opening 22b of the slot 22 in a plane orthogonal to the extending direction A of the covered conductor wire bundle 4 when the cross-section orthogonal to the extending direction A is circular.

3. Layout of Covered Conductor Wire Bundle with Respect to Stator Core

Next, the layout of the covered conductor wire bundles 4 with respect to the stator core 2 according to this embodiment will be described in detail. As illustrated in FIG. 2, a plurality of covered conductor wire bundles 4 are disposed in each slot 22 of the stator core 2 such that adjacent covered conductor wire bundles 4 are in contact with each other. In the example illustrated in FIG. 2, six covered conductor wire bundles 4 are disposed in each slot 22. In this embodiment, the covered conductor wire bundles 4 are disposed in each slot 22 so as to form a line extending in the radial direction R at the same position in the circumferential direction C. Herein, all the plurality of (herein six) covered conductor wire bundles 4 are disposed in each slot 22 so as to be aligned in the radial direction R. Accordingly, the stator 1 has a multilayer winding structure (herein a six-layer winding structure) in which the plurality of covered conductor wire bundles 4 are aligned in the radial direction R. In addition, each of the covered conductor wire bundles 4 is disposed in the corresponding slot 22 so as to extend linearly along the slot 22 in the extending direction A parallel to the axial direction L.

In the present invention, the number of covered conductor wire bundles 4 disposed in each slot 22 is counted by focusing only on portions located inside the slot 22. Therefore, a structure in which six covered conductor wire bundles 4 are disposed in each slot 22 by winding one covered conductor wire bundle 4, which is one continuous wire bundle when detached from the stator core 2, around the same slot 22 six times is also one of preferred embodiments of the present invention. Similarly, it is also preferable that six covered conductor wire bundles 4 be disposed in each slot 22 by winding two covered conductor wire bundles 4, which are two continuous wire bundles when detached from the stator core 2, around the same slot 22 three times or by winding three covered conductor wire bundles 4, which are three continuous wire bundles when detached from the stator core 2, around the same slot 22 two times. In addition, it is also preferable that six covered conductor wire bundles 4 disposed in each slot 22 be six separate wire bundles when detached from the stator core 2. In any cases, the coils 3 are structured by winding the covered conductor wire bundles 4 around the stator core 2 such that the plurality of (herein six) covered conductor wire bundles 4 are disposed in each of the slots 22 of the stator core 2.

As described above, the covered conductor wire bundles 4 are structured such that the shapes of the cross-sections (hereinafter referred to as "cross-sectional shapes" as appropriate) thereof orthogonal to the extending direction A can be easily deformed. This enables the covered conductor wire bundles 4 in each slot 22 to be deformed in accordance with the shape of the slot 22 such that the gaps between the covered conductor wire bundles 4 and those between the covered conductor wire bundles 4 and the inner wall surface 22a of the slot 22 are kept small, and thereby leads to an increase in the space factor of the coil 3. In order to reduce the size of the gaps, adjacent covered conductor wire bundles 4 are in contact with each other in each slot 22. More specifically, as illustrated in FIG. 2, each of the covered conductor wire bundles 4 has contact surfaces that follow contact surfaces of the adjacent covered conductor wire bundles 4, and is in surface contact with the adjacent covered conductor wire bundles 4 at the contact surfaces. In addition, in this embodiment, all the covered conductor wire bundles 4 disposed in each slot 22 have portions whose shapes follow the inner wall surface 22a of the slot 22, and are in surface contact with the inner wall surface 22a at the portions. That is, the covered conductor wire bundles 4 each have contact surfaces that are parallel to the inner wall surface 22a and that are in surface contact with the inner wall surface 22a. In this embodiment, surface contact refers to a state where two surfaces having more than or equal to a predetermined area are in contact with each other. The predetermined area is set to, for example, more than or equal to the cross-sectional area (cross-sectional area orthogonal to the extending direction A) of the conductor wires 41.

The contact surfaces of the covered conductor wire bundles 4 described above are formed by deformation of each covered conductor wire bundle 4 pushed toward the inner wall surface 22a or the other covered conductor wire bundles 4 in each slot 22. That is, in this embodiment, the covered conductor wire bundles 4 are disposed in each slot 22 while maintaining the shapes formed when the covered conductor wire bundles 4 are pushed from a radial opening 22b side of the slot 22 that is open in the direction orthogonal to the extending direction A. Herein, the terms "while maintaining the shapes formed when the covered conductor wire bundles 4 are pushed" indicate a state where the covered conductor wire bundles 4 are deformed in the slot 22 by any small pushing force acting on the covered conductor wire bundles 4 from the radial opening 22b side compared with a natural state where no external force acts on the covered conductor wire bundles 4. Accordingly, the terms also indicate maintenance of the shapes in a state where the covered conductor wire bundles 4 are pushed with pushing force lower than that acting on the covered conductor wire bundles 4 in the slot 22 in processes of manufacturing the stator 1 as described below. In other words, the terms also indicate a state after the pushing force applied in the processes of manufacturing the stator 1 is removed and some return occurs in the shapes of the covered conductor wire bundles 4.

In addition, the thickness (cross-sectional area orthogonal to the extending direction A) of each covered conductor wire bundle 4 is set such that the plurality of (herein six) covered conductor wire bundles 4 fill the space inside each slot 22. Therefore, when the plurality of (herein six) covered conductor wire bundles 4 are accommodated in the slot 22, the covered conductor wire bundles 4 are deformed by the contact with each other or contact with the inner wall surface 22a of the slot 22, and the gaps between the covered conductor wire bundles 4 and those between the covered conductor wire bundles 4 and the inner wall surface 22a of the slot 22 become significantly small as illustrated in FIG. 2. In this state, the shape combining the cross-sectional shapes of the covered conductor wire bundles 4 corresponds to the cross-sectional shape of the slot 22, the cross-sectional shape being orthogonal to the axial direction L. In this embodiment, the inner wall surface 22a of each slot 22 has two non-parallel planes facing each other and a plane with an arc-shaped cross-section extending in the axial direction L. When relatively thick linear conductors with a fixed cross-sectional shape are disposed in this slot 22, large gaps are easily formed between the linear conductors and the inner wall surface 22a of the slot 22. In accordance with the structure according to this embodiment, however, the cross-sectional shape of each covered conductor wire bundle 4 is deformed to conform to the shape of the inner wall surface 22a of the slot 22, and the size of the gaps between the covered conductor wire bundles 4 and the inner wall surface 22a can be easily reduced. In this manner, the deformation of the cross-sectional shape of each covered conductor wire bundle 4 enables the covered conductor wire bundles 4 to adhere to adjacent covered conductor wire bundles 4 or enables the covered conductor wire bundles 4 and the inner wall surface 22a to adhere to each other, resulting in small-sized gaps. At this moment, each of the cross-sectional shapes of the covered conductor wire bundles 4 is deformed in various manners since the individual cross-sectional shapes of the covered conductor wire bundles 4 are deformed to conform to the shape of the inner wall surface 22a or the covered conductor wire bundles 4 whose cross-sectional shapes can be easily deformed push each other. This causes differences in the individual cross-sectional shapes of the covered conductor wire bundles 4 disposed in the same slot 22.

In order to accommodate the covered conductor wire bundles 4 in each slot 22 while the gaps are small as described above, it is preferred that the covered conductor wire bundles 4 maintain the shapes formed when the covered conductor wire bundles 4 are pushed from the radial opening 22b side of the slot 22 in each slot 22. In this embodiment, a closing member 25 for closing the radial opening 22b is disposed at the radial opening 22b of each slot 22 to prevent protrusion of the covered conductor wire bundles 4 from the radial opening 22b. Herein, the closing member 25 is a tabular member that closes the entire radial opening 22b. Such members are referred to as so-called wedges. This closing member 25 supports the covered conductor wire bundles 4 from the inner side in the radial direction R by coming into contact with the surfaces located outward in the radial direction R in the circumferential protruding portions 23b which are formed at the end portion of the teeth 23. For this purpose, the closing member 25 has a width larger than the open width W of the radial opening 22b of the slot 22 in the circumferential direction C and a length equal to that of the stator core 2 in the axial direction L. This closing member 25 is preferably composed of a material with relatively high magnetic and electrical resistance such as synthetic resins. Herein, a structure in which no closing member 25 is disposed at the radial opening 22b is also one of preferred embodiments. In this case, the covered conductor wire bundle 4 closest to the radial opening 22b is deformed so as to be larger than the open width W of the radial opening 22b in the slot 22 in the circumferential direction C to function as the closing member 25. This enables the covered conductor wire bundles 4 to maintain the shapes formed when pushed from the radial opening 22b side of the slot 22.

As illustrated in FIG. 1, the covered conductor wire bundles 4 accommodated in a slot 22 protrude from the ends of the stator core 2 in the axial direction L, and extend in the circumferential direction C to be accommodated in another slot 22. In the example illustrated in FIG. 1, the stator core 2 has forty-eight slots 22 distributed in the circumferential direction C, and the number of slots per pole per phase is set to "2". In addition, the covered conductor wire bundles 4 in the slot 22 are connected to the covered conductor wire bundles 4 in another slot 22 formed at a position remote from the slot 22 by six slots. Although only a part of the covered conductor wire bundles 4 connecting a pair of slots 22 is illustrated in FIG. 1, all the slots 22 are similarly connected in pairs by parts of the covered conductor wire bundles 4 protruding from the stator core 2 in the axial direction L and extending in the circumferential direction C in practical cases. In this manner, the coil end portions are formed of the assemblies of the covered conductor wire bundles 4 protruding from the stator core 2. Herein, the coil end portions refer to portions of the coils 3 protruding from the stator core 2 outward in the axial direction L. The specific layout of the covered conductor wire bundles 4 at the coil end portions varies in accordance with the winding methods, including lap winding and wave winding, of the coils 3. In the present invention, the winding methods of the coils 3 may be freely selected as described above.

4. Method of Manufacturing Stator

Next, a method of manufacturing the stator 1 according to this embodiment will be described. FIGS. 5A to 5C illustrate processes of manufacturing the stator 1 according to this embodiment in sequence. FIGS. 5A to 5C and the description using FIGS. 5A to 5C below focus on only one slot 22 among the plurality of slots 22 of the stator core 2. The stator 1 can be manufactured by performing the same processes on the other slots 22. First, the covered conductor wire bundles 4 are fitted into the slot 22 as illustrated in FIG. 5A. Herein, the covered conductor wire bundles 4 are fitted from the radial opening 22b one by one. In this manner, the covered conductor wire bundles 4 are fitted into the slot 22 from the inner side toward outer side in the radial direction R through the radial opening 22b. In this embodiment, the diameter D of the cross-sectional shape of the covered conductor wire bundle 4 is larger than the open width W of the radial opening 22b of the slot 22 in the circumferential direction C when the cross-sectional shape is a circle. Accordingly, the covered conductor wire bundles 4 are fitted from the radial opening 22b into the slot 22 while the cross-sectional shapes of the covered conductor wire bundles 4 are deformed such that the width thereof in the circumferential direction C is smaller than or equal to the open width W. Since the diameter of the covered conductor wire bundles 4 is larger than the open width W of the radial opening 22b as described above, the number of turns of the covered conductor wire bundles 4 around the stator core 2 can be kept small, and thereby the winding process can be performed efficiently.

After all the (herein six) covered conductor wire bundles 4 are fitted in the slot 22, the covered conductor wire bundles 4 are pushed from the radial opening 22b of the slot 22 as illustrated in FIG. 5B. Herein, a pushing jig 5 is fitted from the radial opening 22b such that the covered conductor wire bundles 4 are pushed outward in the radial direction R. This enables the covered conductor wire bundles 4 in the slot 22 to be deformed to conform to the shape of the slot 22 such that the gaps between the covered conductor wire bundles 4 and the inner wall surface 22a of the slot 22 and those between the covered conductor wire bundles 4 are made small. Finally, the closing member 25 is fitted into the radial opening 22b of the slots 22 as illustrated in FIG. 5C. Herein, the closing member 25 is disposed between the circumferential protruding portions 23b of the teeth 23 and the surface of the covered conductor wire bundle 4 closest to the radial opening 22b (the surface located most inward in the radial direction R) among the plurality of covered conductor wire bundles 4 in the slot 22. For example, the tabular closing member 25 can be fitted from the axial opening 22c of the slot 22 in the axial direction L. The closing member 25 disposed in this manner can prevent the covered conductor wire bundles 4 disposed in the slot 22 from protruding from the radial opening 22b. In addition, the covered conductor wire bundles 4 can maintain the shapes formed when pushed from the radial opening 22b side of the slot 22. It is also preferable that the closing member 25 be omitted as described above. Thus, each of the covered conductor wire bundles 4 disposed in each slot 22 has a cross-sectional shape that differs from those of the other covered conductor wire bundles 4 in the same slot 22.

5. Other Embodiments

Lastly, other embodiments of the present invention will be described. The structure of each embodiment described below is not limited to application in isolation, and may be applied by being combined with the structures of the other embodiments unless otherwise inconsistent.

(1) In the embodiment described above, the contact surfaces of adjacent pairs of the covered conductor wire bundles 4 in each slot 22 extend in a direction orthogonal to the radial direction R (circumferential direction C) as illustrated in FIGS. 2 and FIGS. 5A to 5C. In practical cases, however, the contact surfaces of adjacent pairs of the covered conductor wire bundles 4 are mostly not arranged in such an orderly manner, and it is conceivable that the contact surfaces of adjacent pairs of the covered conductor wire bundles 4 in the slot 22 are often disposed randomly facing in various directions as illustrated in, for example, FIG. 6. In this case, the cross-sectional shapes of the covered conductor wire bundles 4 disposed in the same slot 22 significantly differ from each other. However, the gaps in the slot 22 can be kept small and thereby the space factor of the coil 3 can be increased also in this structure by placing the covered conductor wire bundles 4 such that the covered conductor wire bundles 4 maintain the shapes formed when the covered conductor wire bundles 4 are pushed from the radial opening 22b side of the slot 22 as in the above-described embodiment. Accordingly, this structure is also one of preferred embodiments of the present invention.

Figure 7:
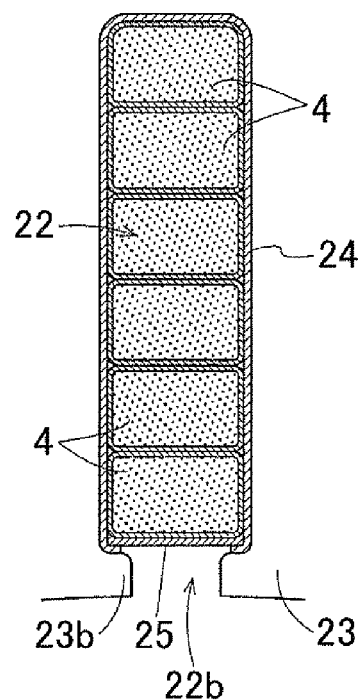
FIG. 7 is a partially enlarged cross-sectional view illustrating another embodiment of the stator for the rotating electrical machine according to the present invention.
Figure 8:
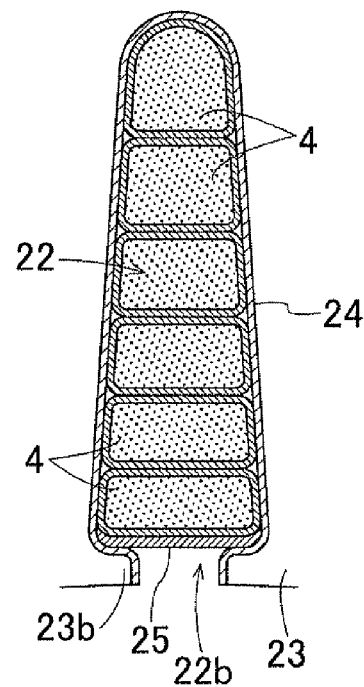
FIG. 8 is a partially enlarged cross-sectional view illustrating another embodiment of the stator for the rotating electrical machine according to the present invention.

(2) In the embodiment described above, the teeth 23 are parallel teeth each having the two side surfaces 23a parallel to each other and the width of the slots 22 in the circumferential direction C increases outward in the radial directions R. However, the embodiments of the present invention are not limited to this structure. For example, a structure in which the slots 22 are so-called parallel slots whose width in the circumferential direction C is fixed regardless of the position in the radial directions R as illustrated in FIG. 7 is also one of preferred embodiments of the present invention. In this case, the inner wall surface 22a of each slot 22 has two planes facing each other in the circumferential direction C and being parallel to each other. In the example illustrated in FIG. 7, each slot 22 has a plane orthogonal to the radial direction R formed at an outward portion of the inner wall surface 22a in the radial direction R. In addition, the slot 22 can be formed such that the width of the slot 22 in the circumferential direction C decreases outward in the radial direction R as illustrated in FIG. 8. In this case, the inner wall surface 22a of each slot 22 has two planes formed such that the two planes face each other in the circumferential direction C and the gap between the two planes decreases outward in the radial direction R.

Figure 9:
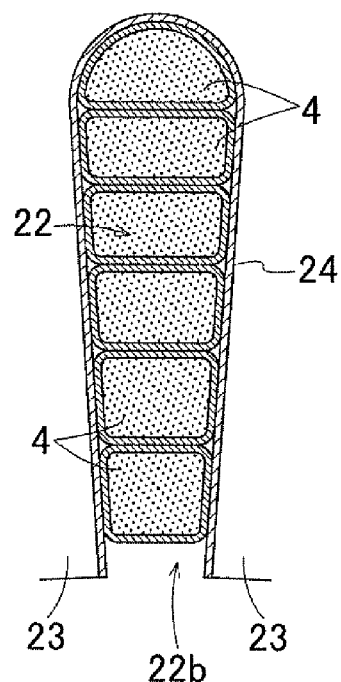
FIG. 9 is a partially enlarged cross-sectional view illustrating another embodiment of the stator for the rotating electrical machine according to the present invention.

(3) In the embodiment described above, each tooth 23 has the circumferential protruding portions 23b at the end portion thereof and the open width W of the radial opening 22b in each slot 22 is smaller than other portions, that is, the slots 22 are so-called semi-open slots. However, the embodiments of the present invention are not limited to this structure. For example, a structure in which no circumferential protruding portions 23b are formed at the end portion of each tooth 23 and the inner wall surface 22a of each slot 22 extends to the radial opening 22b while remaining flat as illustrated in FIG. 9, that is, the slots 22 are so-called open slots, is also one of preferred embodiments of the present invention. Although wedges such as the closing member 25 for closing the radial opening 22b may be provided in this case, a structure which does not include the closing member 25 may be employed as illustrated in FIG. 9.

Figure 10:
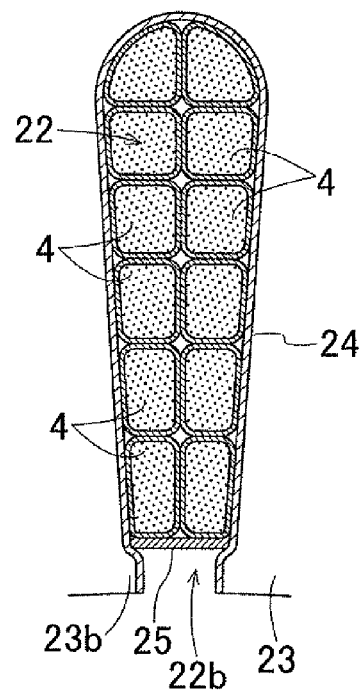
FIG. 10 is a partially enlarged cross-sectional view illustrating another embodiment of the stator for the rotating electrical machine according to the present invention.

(4) In the embodiment described above, all the plurality of (six) covered conductor wire bundles 4 disposed in each slot 22 are aligned in the radial direction R. However, the embodiments of the present invention are not limited to this structure. A structure in which the covered conductor wire bundles 4 aligned in the radial direction R are arranged in a plurality of rows in the circumferential direction C in each slot 22 is also one of preferred embodiments of the present invention. For example, it is preferred that twelve covered conductor wire bundles 4 be aligned in the radial direction R in two rows of six such that the two rows are arranged adjacent to each other in the circumferential direction C in each slot 22 as illustrated in FIG. 10.

(5) In the embodiment described above, all the covered conductor wire bundles 4 disposed in each slot 22 are in surface contact with the inner wall surface 22a as illustrated in FIGS. 2 and 6 to 10. However, the embodiments of the present invention are not limited to this structure, and a structure in which only some of the covered conductor wire bundles 4 disposed in each slot 22 has portions whose shapes follow the inner wall surface 22a of the slot 22 and is in surface contact with the inner wall surface 22a at the portions is also one of preferred embodiments of the present invention. For example, it is preferred that the number of rows of the covered conductor wire bundles 4 in the circumferential direction C be increased compared with the example illustrated in FIG. 10 such that three or more rows of the covered conductor wire bundles 4 are arranged in the circumferential direction C. In this structure, some of the covered conductor wire bundles 4 is disposed at positions at which they are only in contact with the other covered conductor wire bundles 4 without being in contact with the inner wall surface 22a of the slot 22. Also in this case, the covered conductor wire bundles 4 are disposed in each slot 22 such that the covered conductor wire bundles 4 adjacent to each other are in contact with each other.

(6) In the embodiment described above, the diameter D of the cross-sectional shapes of the covered conductor wire bundles 4 is larger than the open width W of the radial openings 22b of the slots 22 when the cross-sectional shapes are circles. However, the embodiments of the present invention are not limited to this structure. That is, a structure in which the diameter D of the cross-sectional shapes of the covered conductor wire bundles 4 is smaller than the open width W of the radial openings 22b of the slots 22 when the cross-sectional shapes are circles is also one of preferred embodiments of the present invention.

(7) In the embodiment described above, the slot insulating portions 24 are formed on the inner wall surfaces 22a of the slots 22 by insulating powder coating. However, the structure of the slot insulating portions 24 is not limited to this. For example, a structure in which the slot insulating portions 24 are formed of slot insulating sheets placed along the inner wall surfaces 22a of the slots 22 is also one of preferred embodiments of the present invention. In cases where the slot insulating sheets are used, the slot insulating portions 24 do not need to extend to the radial openings 22b of the slots 22, and are basically formed only in areas where the covered conductor wire bundles 4 are to be disposed. FIG. 7 illustrates an example structure of such slot insulating portions 24.

Although not illustrated, a structure in which the inner wall surfaces 22a of the slots 22 have no slot insulating portions 24 is also one of preferred embodiments of the present invention. Since the outer circumferential surfaces of the covered conductor wire bundles 4 are covered with the insulating covers 43, the covered conductor wire bundles 4 are electrically insulated from the stator core 2 also in this case.

(8) In the embodiment described above, the cross-sections of the conductor wires 41 have a circular shape. However, the embodiments of the present invention are not limited to this structure. A structure in which cross-sections of the conductor wires 41 that are orthogonal to the extending direction A, have, for example, a polygonal shape such as a rectangular, triangular, pentagonal, hexagonal, and octagonal shape is also one of preferred embodiments of the present invention.

(9) In the embodiment described above, the slots 22 have the radial openings 22b that are open inward in the radial directions R. This structure is suitable for a rotating electrical machine of the inner rotor type including a rotor disposed inward of the stator 1 in the radial directions R. However, the embodiments of the present invention are not limited to this. For example, a structure in which the slots 22 have radial openings that are open outward in the radial directions R is also one of preferred embodiments of the present invention. This structure is suitable for a rotating electrical machine of the outer rotor type including a rotor disposed outward of the stator 1 in the radial directions R. The present invention can be preferably used for rotating electrical machines of the axial gap type in addition to those of the radial gap type.

The present invention can be preferably used for a stator for a rotating electrical machine including a stator core with a plurality of slots and coils attached to the stator core.

What is claimed is:

1. A stator for a rotating electrical machine comprising:
   a stator core with a plurality of slots in which a width of the slot opening that opens in a radial direction of the core is narrower than a width of a portion of the semi-open slots located deeper than the slot opening of the semi-open slots; and
   coils attached to the stator core, wherein
   the coils are each structured by winding a covered conductor wire bundle around the stator core,
   the covered conductor wire bundle is structured by covering an outer circumference of a conductor wire bundle with a flexible insulating cover, the conductor wire bundle consisting of an assembly of a plurality of conductor wires, the conductor wires each having a circular cross-section orthogonal to a direction along which the conductor wires extend, the plurality of conductor wires can relatively move inside the insulating cover, shapes of cross-sections of the covered conductor wire bundles orthogonal to the extending direction of the covered conductor wire bundles being deformable by relatively moving the plurality of conductor wires inside the insulating cover, the conductor wires being bare wires, the flexible insulating cover tying the bare wires to each other, with the bare wires being in a twisted state, and
   a plurality of the covered conductor wire bundles are disposed in each of the slots such that adjacent pairs of the covered conductor wire bundles are in contact with each other by deforming shapes of cross-sections of the covered conductor wire bundles orthogonal to the extending direction of the covered conductor wire bundles by relatively moving the plurality of conductor wires inside the insulating cover so that the shapes of cross-sections of the covered conductor wire bundles conform to the shape of the slots in the portion of the slots located deeper than the slot opening.

2. The stator for the rotating electrical machine according to claim 1, wherein the cross-sections of the covered conductor wire bundles disposed in the same slots have different shapes, the cross-sections being orthogonal to a direction along which the covered conductor wire bundles extend.

3. The stator for the rotating electrical machine according to claim 2, wherein at least one of the covered conductor wire bundles disposed in each slot has a portion whose shape follows an inner wall surface of the slot, and is in surface contact with the inner wall surface at the portion.

4. The stator for the rotating electrical machine according to claim 2, wherein a diameter of the cross-sections of the covered conductor wire bundles is larger than an open width of openings of the slots in a plane orthogonal to a direction along which the covered conductor wire bundles extend when the cross-sections orthogonal to the extending direction are circular.

5. The stator for the rotating electrical machine according to claim 4, wherein the covered conductor wire bundles are disposed in each slot while maintaining the shapes formed when the covered conductor wire bundles are pushed from an opening side of the slot that is open in a direction orthogonal to a direction along which the covered conductor wire bundles extend.

6. The stator for the rotating electrical machine according to claim 5, wherein
   the slots extend in an axial direction of a cylindrical core reference plane of the stator core and are distributed in a circumferential direction of the core reference plane,
   the stator core have a plurality of teeth formed between two adjacent slots, and
   each tooth has two side surfaces that face in the circumferential direction and that are parallel to each other.

7. The stator for the rotating electrical machine according to claim 1, wherein at least one of the covered conductor wire bundles disposed in each slot has a portion whose shape follows an inner wall surface of the slot, and is in surface contact with the inner wall surface at the portion.

8. The stator for the rotating electrical machine according to claim 7, wherein a diameter of the cross-sections of the covered conductor wire bundles is larger than an open width of openings of the slots in a plane orthogonal to a direction along which the covered conductor wire bundles extend.

9. The stator for the rotating electrical machine according to claim 7, wherein the covered conductor wire bundles are disposed in each slot while maintaining the shapes formed when the covered conductor wire bundles are pushed from an opening side of the slot that is open in a direction orthogonal to a direction along which the covered conductor wire bundles extend.

10. The stator for the rotating electrical machine according to claim 1, wherein a diameter of the cross-sections of the covered conductor wire bundles is larger than an open width of openings of the slots in a plane orthogonal to a direction along which the covered conductor wire bundles extend.

11. The stator for the rotating electrical machine according to claim 1, wherein the covered conductor wire bundles are disposed in each slot while maintaining the shapes formed when the covered conductor wire bundles are pushed from an opening side of the slot that is open in a direction orthogonal to a direction along which the covered conductor wire bundles extend.

12. The stator for the rotating electrical machine according to claim 1, wherein the slots extend in an axial direction of a cylindrical core reference plane of the stator core and are distributed in a circumferential direction of the core reference plane,
the stator core have a plurality of teeth formed between two adjacent slots, and
each tooth has two side surfaces that face in the circumferential direction and that are parallel to each other.

* * * * *